United States Patent
Mancinelli et al.

(10) Patent No.: US 10,596,868 B2
(45) Date of Patent: Mar. 24, 2020

(54) PROCESS AND DEVICE OF CONTROL AND REGULATION OF THE PRESSURE OF TYRES ADAPTING TO CHANGES IN LOAD APPLIED THERETO

(71) Applicant: Trelleborg Wheel Systems Italia S.p.A., Tivoli (RM) (IT)

(72) Inventors: Piero Mancinelli, Tivoli (RM) (IT); Massimo Limiti, Tivoli (RM) (IT); Domiziano Beltramme, Tivoli (RM) (IT)

(73) Assignee: Trelleborg Wheel Systems Italia S.p.A., Tivoli (IT)

( * ) Notice: Subject to any disclaimer, the term of this patent is extended or adjusted under 35 U.S.C. 154(b) by 113 days.

(21) Appl. No.: 15/765,722

(22) PCT Filed: Oct. 6, 2016

(86) PCT No.: PCT/IT2016/000229
§ 371 (c)(1),
(2) Date: Apr. 4, 2018

(87) PCT Pub. No.: WO2018/033942
PCT Pub. Date: Feb. 22, 2018

(65) Prior Publication Data
US 2018/0281535 A1    Oct. 4, 2018

(30) Foreign Application Priority Data
Oct. 6, 2015   (IT) ................. 102015000058659

(51) Int. Cl.
B60C 23/10    (2006.01)
B60C 23/06    (2006.01)
B60C 23/00    (2006.01)
B60C 23/04    (2006.01)

(52) U.S. Cl.
CPC .......... *B60C 23/064* (2013.01); *B60C 23/001* (2013.01); *B60C 23/002* (2013.01);
(Continued)

(58) Field of Classification Search
None
See application file for complete search history.

(56) References Cited

U.S. PATENT DOCUMENTS 6,339,956 B1   1/2002   Huinink et al.
7,302,837 B2 *  12/2007  Wendte ................ B60C 23/002
                                                              340/442
(Continued)

FOREIGN PATENT DOCUMENTS

| EP | 1449684 | 8/2004 |
| EP | 2818337 | 12/2014 |
| WO | WO 2018/033942 | 2/2018 |

OTHER PUBLICATIONS

International Search Report and the Written Opinion dated Apr. 10, 2017 From the International Searching Authority Re. Application No. PCT/IT2016/000229. (13 Pages).
Rapporto di Ricerca e Opinione Scritta [Search Report and Written Opinion] dated Jun. 17, 2016 From the Ministero Dello Sviluppo Economico, Direzione Generale Sviluppo Produttivo e Competitivita, Ufficio Italiano Brevetti e Marchi Re. Application No. ITUB20154063. (10 Pages).

*Primary Examiner* — Natalie Huls
*Assistant Examiner* — Jermaine L Jenkins

(57) ABSTRACT

A process and a device of control and regulation of the pressure of tyres apt to ensure the adaptation of the footprint of a tyre to changes in the load applied thereto. The process includes the following steps:
  measuring the pressure of the tyre,
  measuring the footprint or the deflection of the tyre,
  determining a calculated value of footprint or of deflection in function of said optimum value of pressure, said calculated value of footprint or of deflection being determined by means of a correlation, based on experimental data, of values of pressure, footprint or deflection and applied load,
(Continued)

if said calculated value of footprint or of deflection is different from respectively said measured value of footprint or of deflection:
  modifying the pressure of the tyre to reduce the difference between said measured value of pressure and said optimum value of pressure.

11 Claims, 3 Drawing Sheets

(52) U.S. Cl.
  CPC .......... B60C 23/0486 (2013.01); B60C 23/10 (2013.01); *B60C 2200/08* (2013.01); *B60T 2240/04* (2013.01)

(56) References Cited

U.S. PATENT DOCUMENTS

| | | | |
|---|---|---|---|
| 8,136,561 B2* | 3/2012 | Sandoni | B60C 23/003 |
| | | | 152/415 |
| 9,248,707 B2* | 2/2016 | Zhou | B60C 23/003 |
| 9,579,935 B2* | 2/2017 | Infantini | B60C 23/00 |
| 9,597,932 B2* | 3/2017 | Dieckmann | B60C 23/003 |
| 9,884,522 B2* | 2/2018 | King | B60C 23/003 |
| 10,024,762 B2* | 7/2018 | Posselius | G01M 17/013 |
| 10,471,783 B2* | 11/2019 | Worth | B60C 23/10 |
| 10,503,153 B2* | 12/2019 | Ciovnicu | B60C 23/003 |
| 2005/0097949 A1 | 5/2005 | Hillenmayer et al. | |
| 2016/0059643 A1* | 3/2016 | Infantini | B60C 23/00 |
| | | | 152/415 |

* cited by examiner

US 10,596,868 B2

PROCESS AND DEVICE OF CONTROL AND REGULATION OF THE PRESSURE OF TYRES ADAPTING TO CHANGES IN LOAD APPLIED THERETO

RELATED APPLICATIONS

This application is a National Phase of PCT Patent Application No. PCT/IT2016/000229 having International filing date of Oct. 6, 2016, which claims the benefit of priority of Italian Patent Application No. 102015000058659 filed on Oct. 6, 2015. The contents of the above applications are all incorporated by reference as if fully set forth herein in their entirety.

FIELD AND BACKGROUND OF THE INVENTION

The present invention concerns a process of control and regulation of the pressure of tyres.

The invention concerns in particular the field of tyres for agricultural use, but can be used in all applications that need a control of the pressure of the tyres and in which there exists the need to adjust the pressure depending on the use.

It is known that tyres for agricultural applications have among the most popular targets the obtaining of the correct performance on the field and on the road, which is connected to the need to have an appropriate value of pressure of inflation.

In the case where tyres are used on agricultural machines operated with high and time-varying loads, this is more necessary than ever.

Making reference to the machines of high dimensions (harvesters, sprayers, spreader, trailers and tractors), it is clear that the same are subjected to cycles of loading and unloading and as a result divide on the tyres a force which varies from a minimum (Lmin) under conditions in which the machine is discharged, up to a maximum (Lmax) when the machine is at full load. By varying the force applied and at a constant pressure, the shape of the tyre is changed, assuming a profile flatter and flatter with increasing load. The change of the profile of the tyre also involves the change of the footprint on the ground, also said footprint, of the same and, consequently, its adherence.

In this context it is included the solution according to the present invention, which aims to ensure the possibility of adjusting the pressure of a tyre, in particular a tyre for agricultural machines, with the aim to adapt the footprint to the variation of load, by suitably modifying the internal pressure.

For this purpose, according to the present invention are proposed a process and a device of control and regulation of the pressure of tyres, in particular tyres for agricultural use, where the objective to adapt the footprint, changing the internal pressure when the load imposed on the tyre varies, is reached by calibrating the footprint itself or the flattening under load of the tyre. This aim is achieved by the controlling of the footprint or of the deflection and the adjustment of the pressure, depending on the temperature, through a series of gauges in conjunction with an electronic system that, as a function of the measurements made, acts consequently on a compressor or a release valve.

The purpose of the present invention is therefore to provide a process and a device of control and regulation of the pressure of tyres, in particular tyres for agricultural use, which allows not to exceed the limits of the control systems according to the prior art and to obtain the previously described technical results.

SUMMARY OF THE INVENTION

A further object of the invention is that said process and said device of control and regulation of the pressure of tyres can be implemented with substantially limited costs, both as regards production costs and as regards operating costs.

Another object of the invention is to propose a process and a device of control and regulation of the pressure of tyres, in particular tyres for agricultural use, which is simple, safe and reliable.

It is therefore a first object of the present invention a process of control and regulation of the pressure of tyres, in particular for agricultural use, apt to ensure the adaptation of the footprint of a tyre to changes in the load applied thereto, characterised in that it comprises the following steps:
  measuring the pressure of the tyre,
  measuring the footprint or the deflection of the tyre,
  determining a calculated value of the load applied to said tyre, said calculated value of the applied load being determined, in function of said measured value of the footprint or of the deflection and of said measured value of the pressure, by means of a correlation, based on experimental data, of values of pressure, footprint or deflection and applied load,
  determining an optimum value of pressure corresponding to said calculated value of the applied load, said optimum value of pressure being determined by means of characteristic tables of said tyre,
  determining a calculated value of footprint or of deflection in function of said optimum value of pressure, said calculated value of footprint or of deflection being determined by means of a correlation, based on experimental data, of values of pressure, footprint or deflection and applied load, if said calculated value of footprint or deflection is different from respectively said measured value of footprint or deflection:
  modifying the pressure of the tyre to reduce the difference between said measured value of pressure and said optimum value of pressure, repeating the steps of the process until said measured value of the footprint or of the deflection reaches said calculated value of the footprint or of the deflection.

Preferably, according to the invention, said process additionally comprises a step of measuring the temperature, the measured values of temperature contributing to the determination of the correlation between values of footprint or of deflection, pressure and load.

It is moreover a second object of the present invention a device of control and regulation of the pressure of tyres, in particular for agricultural use, apt to ensure the adaptation of the footprint of a tyre to changes in the load applied thereto, comprising a pressure meter and a footprint meter or a deflection meter of a tyre, an electronic management system, connected in input to said pressure meter and to said deflection meter or footprint meter, a compressor, actuated by said electronic management system, a release and safety valve, actuated by said electronic management system, and a power supply system, said electronic management system being configured to:
  determining continuously a value of the applied load on said tyre, in function of said measured value of the footprint or of the deflection and of said measured value of the pressure, by means of a correlation, based on experimental data, of values of pressure, footprint or deflection and applied load, determining an optimum value of pressure corresponding to said calculated value of the applied load, said optimum value of pressure being determined by means of characteristic tables of said tyre, determining a calculated value of footprint or of deflection in function of said optimum value of pressure, said calculated value of footprint or of deflection being determined by means of a correlation, based on experimental data, of values of pressure, footprint or deflection and applied load, and if said calculated value of footprint or deflection is different from respectively said measured value of footprint or deflection:

modifying the pressure of the tyre to reduce the difference between said measured value of pressure and said optimum value of pressure, repeating the steps of the process until when said measured value of the footprint or of the deflection reaches said calculated value of the footprint or of the deflection.

Preferably, according to the present invention, said footprint meter comprises:

accelerometers, or polymeric material having electrical resistance variable according to deformation.

Preferably, according to the present invention, said device of control and regulation of the pressure of tyres comprises in particular one of the following measurement instrument of the deflection:

an extensometer a laser system an infrared system.

Preferably, according to the present invention, said device of control and regulation of the pressure of tyres additionally comprises a temperature meter.

Moreover, according to the present invention, said power supply system can comprise a battery integral with a hub of the wheel or can be apt to get energy directly from the vehicle on which said tyre is installed.

Moreover, according to the present invention, said power supply system can be provided with a pair of collectors, one for the negative pole and one for the positive pole, connected by means of sliding contact with as many brushes as are needed to assure the operation of the device, in turn electrically connected to the vehicle, or of a three-phase motor, comprising a stator and a rotor, in turn electrically connected to the vehicle.

Finally, the device of control and regulation of the pressure of tyres according to the invention, is advantageously applied to agricultural machines used with heavy loads varying in time, such as harvesters, sprayers, spreaders and trailers.

It is evident the effectiveness of the process and the device of the present invention, that allow to adapt the footprint on the ground of a tyre to the varying of the applied load by means of the control of parameters that can be measured through simple and cheap detectors.

BRIEF DESCRIPTION OF THE SEVERAL VIEWS OF THE DRAWINGS

The present invention will be now described, for illustrative but not limitative purposes, according to its preferred embodiment, with particular reference to the annexed figures, in which.

DESCRIPTION OF SPECIFIC EMBODIMENTS OF THE INVENTION

Figure 1:
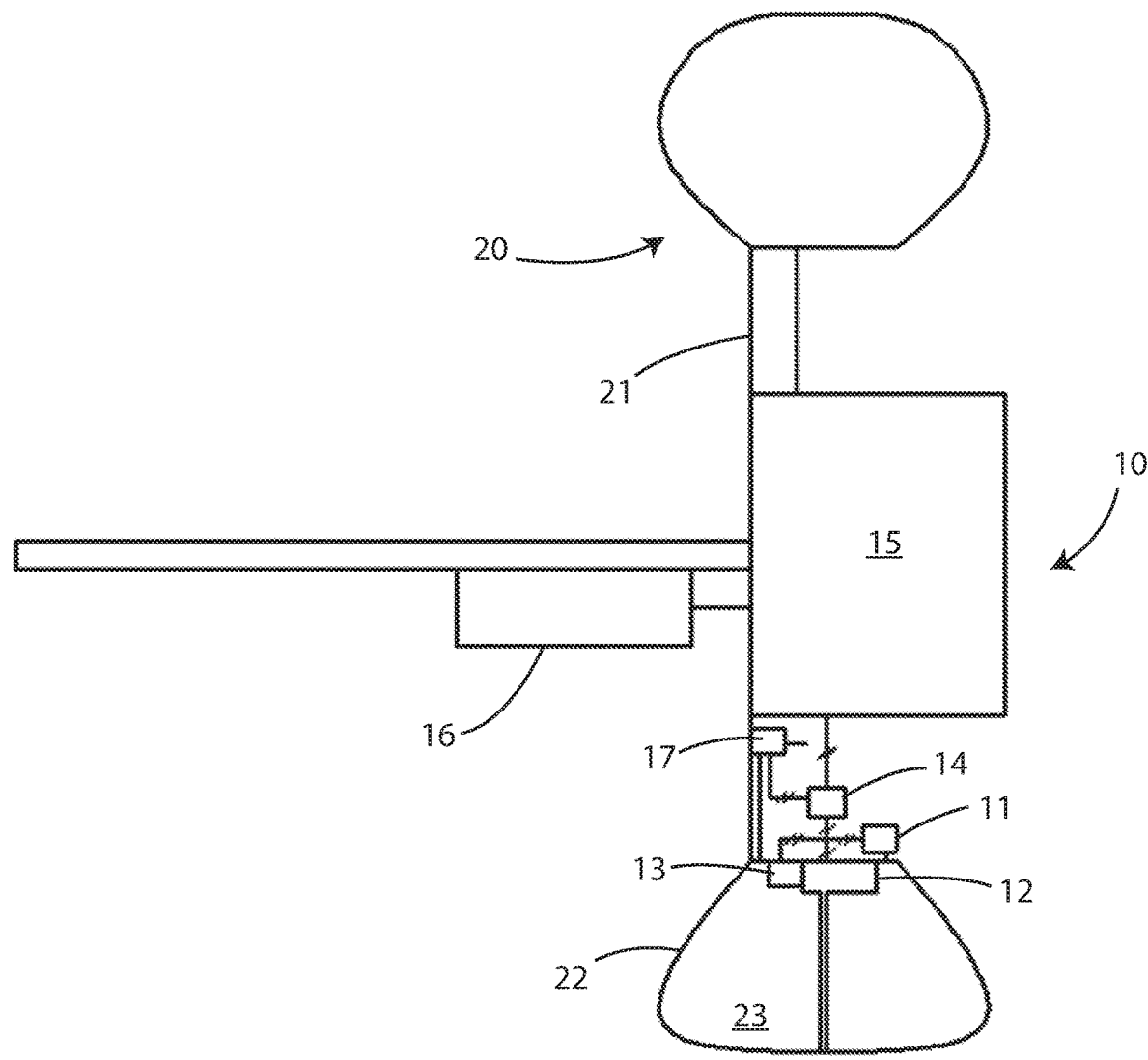
FIG. 1 shows a radial sectional view of a wheel incorporating a process of control and regulation of the pressure of tyres according to the present invention.

Referring to the figures, a device of control and regulation of the pressure of tyres according to a preferred embodiment of the present invention is indicated by the reference number 10 and is shown applied on a wheel 20, essentially consisting of a rim 21 and a tyre 22, inside which it is defined an air chamber 23.

The device of control and regulation of the pressure of tyres according to the present invention comprises a pressure meter 11, a deflection meter 12 of the tyre 22 (or alternatively a footprint meter), a temperature meter 13, an electronic management system 14, a compressor 15 and a power supply system 16. In addition, the device of control and regulation of the pressure of tyres according to the present invention includes a release and safety valve 17.

Figure 4:
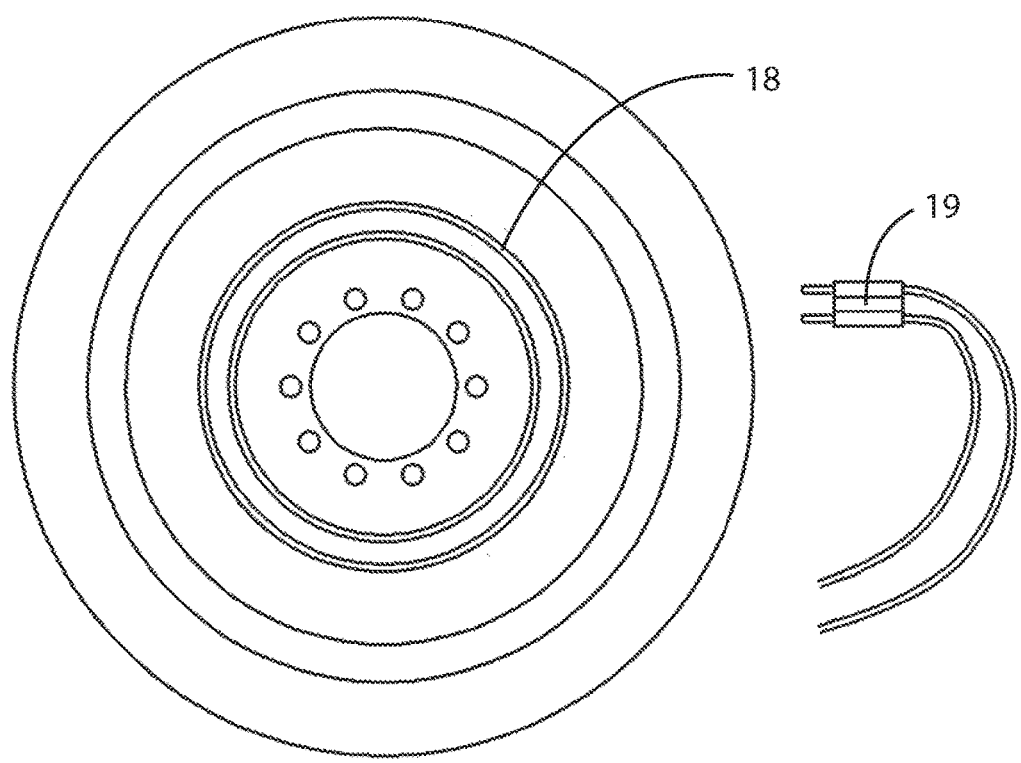
FIG. 4 shows the rim of a tyre according to an embodiment of the present invention, and a corresponding collector.

The power supply system 16 can be constituted by a battery integral with the hub of the wheel, or, as shown by way of example but not of limitation with reference to FIG. 4, can extract energy directly from the vehicle on which said tyre is installed, for example through a pair of collectors 18, one for the negative pole and one for the positive pole, connected by means of sliding contact with as many brushes 19 as are required to ensure operation of the whole device, in turn electrically connected to the vehicle engine.

Given the architecture of the device of control and regulation of the pressure of tyres according to the present invention, the same is particularly suited to harvesters (and harvesters/sprayers), considering both the frequent and high variability of the load during the working cycles, and its possible allocation within the rim.

The operation of the process and device of control and regulation of the pressure of tyres according to the present invention is described in the following, with reference to FIGS. 2 and 3, which show two diagrams in which the abscissa axis shows the deflection of the tyre and the ordinate axis shows the load condition. The two curves p1 and p2 show the relationship between the deflection and the load condition, respectively, for two constant pressure values p1 and p2. The operation of the process and the device of control and regulation of the pressure of tyres according to the present invention is explained in detail by referring to the measurement of the deflection, but perfectly similar reasoning can be made in the case in which the measured parameter is the footprint of the tyre.

Figure 2:
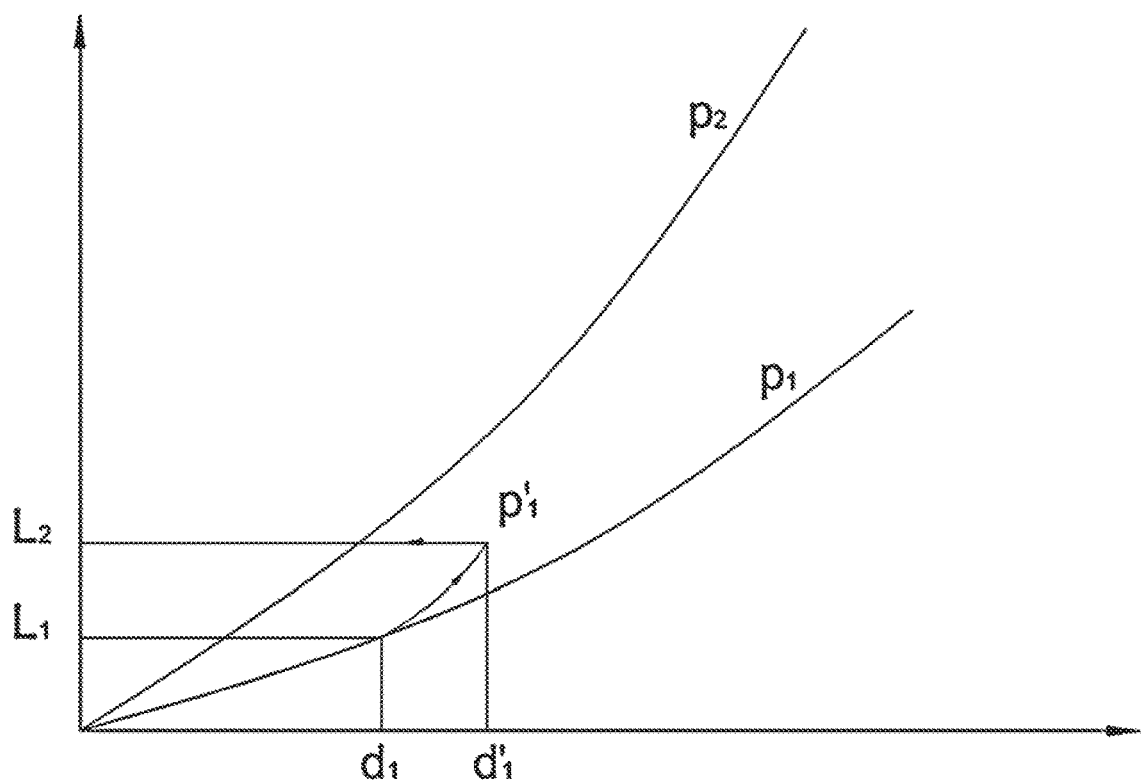
FIG. 2 shows the cycle of control and regulation of the pressure in function of an increase of the load.

In particular, referring to FIG. 2, starting from an initial load condition L1, the pressure and the deflection are respectively p1 and d1. By increasing the load up to L2, the two variables increase, respectively up to p1' and d1'. The regulation device consequently actuates a compressor, capable of increasing the pressure up to p2 in order to obtain the suitable value of deflection. The Δp to be imposed is known from the experimental tests carried out on the covering, which relate L, p and d.

Figure 3:
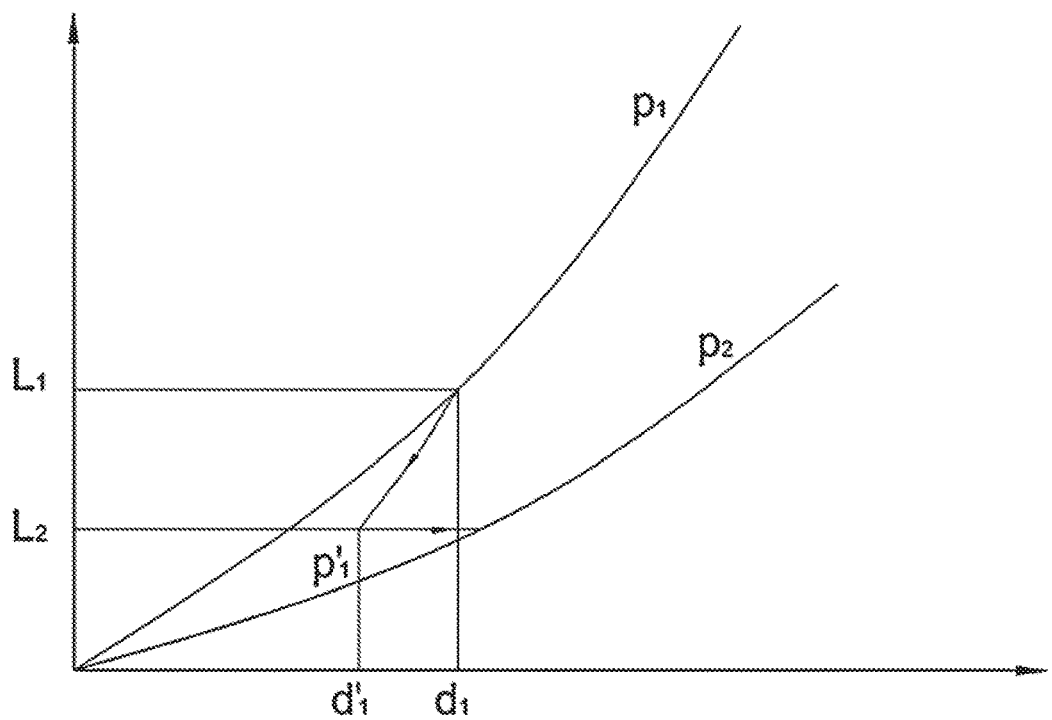
FIG. 3 shows the cycle of control and regulation of the pressure in function of a decrease of the load.

The process is similar in the case of reduction of the load, with a reduction of the pressure rather than an increase, as shown with reference to FIG. 3.

Figure 5:
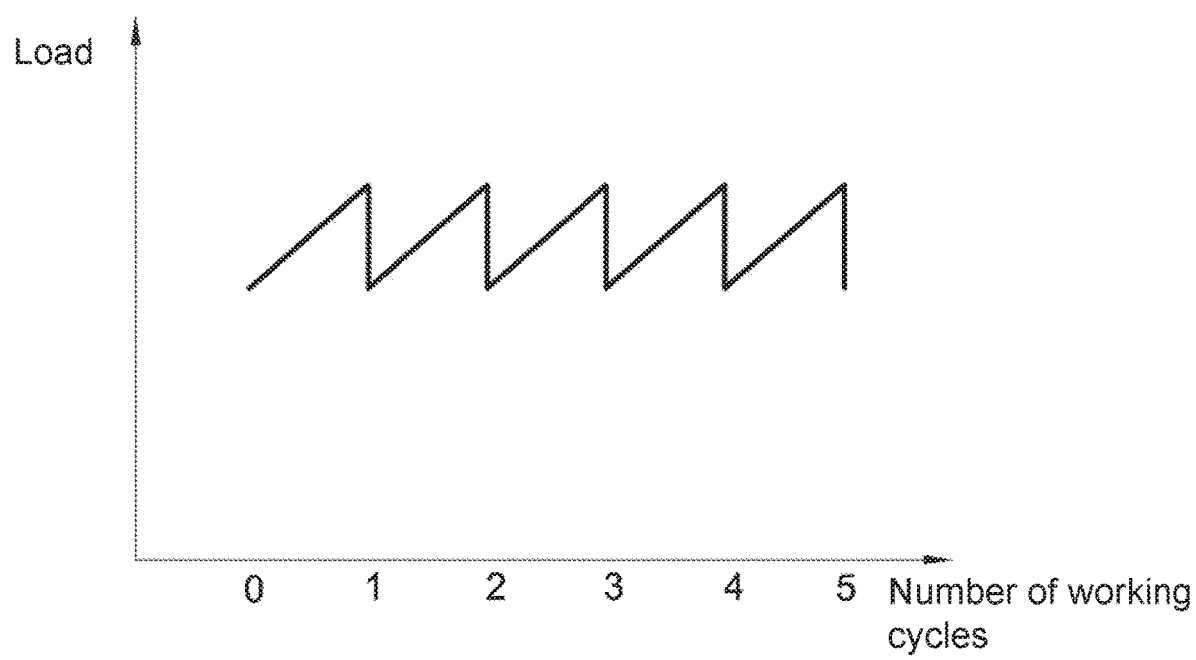
FIG. 5 shows a representative diagram of the typical loading and unloading cycle of a harvesters.

By way of example, FIG. 5 represent a loading and unloading cycle typical of a harvesters.

The present invention has been described for illustrative but not limitative purposes, according to its preferred embodiments, but it is to be understood that variations and/or modifications may be made by those skilled in the art without departing from the relative scope of protection, as defined by the appended claims.

What is claimed is:

1. A process of control and regulation of the pressure of tyres, in particular for agricultural use, apt to ensure the adaptation of the footprint of a tyre to changes in the load applied thereto, wherein the process comprises the following steps:
measuring the pressure of the tyre,
measuring the footprint or the deflection of the tyre,
determining a calculated value of the load applied to said tyre, said calculated value of the applied load being determined, in function of said measured value of the footprint or of the deflection and of said measured value of the pressure, by means of a correlation, based on experimental data, of values of pressure, footprint or deflection and applied load,
determining an optimum value of pressure corresponding to said calculated value of the applied load, said optimum value of pressure being determined by means of characteristic tables of said tyre,
determining a calculated value of footprint or of deflection in function of said optimum value of pressure, said calculated value of footprint or of deflection being determined by means of a correlation, based on experimental data, of values of pressure, footprint or deflection and applied load,
if said calculated value of footprint or of deflection is different from respectively said measured value of footprint or of deflection:
modifying the pressure of the tyre to reduce the difference between said measured value of pressure and said optimum value of pressure,
repeating the steps of the process until said measured value of the footprint or of the deflection reaches said calculated value of the footprint or of the deflection.

2. The process of control and regulation of the pressure of tyres according to claim 1, wherein the process additionally comprises a step of measuring the temperature, the measured values of temperature contributing to the determination of the correlation between values of footprint or of deflection, pressure and load.

3. A device (10) of control and regulation of the pressure of tyres (22), in particular for agricultural use, apt to ensure the adaptation of the footprint of a tyre to changes in the load applied thereto, comprising a pressure meter (11) and a footprint meter or a deflection meter (12) of a tyre (22), an electronic management system (14), connected in input to said pressure meter (11) and to said footprint meter (12) or deflection meter, a compressor (15), actuated by said electronic management system (14), a release and safety valve (17), actuated by said electronic management system (14), and a power supply system (16), wherein said electronic management system (14) being configured to:
determining continuously a value of the applied load on said tyre (22), in function of said measured value of the footprint or of the deflection and of said measured value of the pressure, by means of a correlation, based on experimental data, of values of pressure, footprint or deflection and applied load,
determining an optimum value of pressure corresponding to said calculated value of the applied load, said optimum value of pressure being determined by means of characteristic tables of said tyre,
determining a calculated value of footprint or of deflection in function of said optimum value of pressure, said calculated value of footprint or of deflection being determined by means of a correlation, based on experimental data, of values of pressure, footprint or deflection and applied load, and
if said calculated value of footprint or deflection is different from respectively said measured value of footprint or deflection:
modifying the pressure of the tyre to reduce the difference between said measured value of pressure and said optimum value of pressure,
repeating the steps of the process until when said measured value of the footprint or of the deflection reaches said calculated value of the footprint or of the deflection.

4. The device (10) of control and regulation of the pressure of tyres (22) according to claim 3, wherein said footprint meter comprises:
accelerometers, or
polymeric material having electrical resistance variable according to deformation.

5. The device (10) of control and regulation of the pressure of tyres (22) according to claim 3, wherein said deflection meter comprises:
an extensometer, or
a laser system, or
an infrared system.

6. The device (10) of control and regulation of the pressure of tyres (22) according to claim 3, wherein the device wherein additionally comprises a temperature meter (13).

7. The device (10) of control and regulation of the pressure of tyres (22) according to claim 3, wherein said power supply system (14) consists in a battery integral with the hub of the wheel of a vehicle on which said tyre is installed.

8. The device (10) of control and regulation of the pressure of tyres (22) according to claim 3, wherein said power supply system (14) is apt to get energy directly from the vehicle on which said tyre is installed.

9. The device (10) of control and regulation of the pressure of tyres (22) according to claim 8, wherein said power supply system (14) is provided with a pair of collectors (18), one for the negative pole and one for the positive pole, connected by means of sliding contact with as many brushes (19) as are required to ensure operation of the whole device (10), in turn electrically connected to the vehicle engine.

10. The device (10) of control and regulation of the pressure of tyres (22) according to claim 8, wherein said power supply system is provided with a three-phase motor, comprising a stator and a rotor, in turn electrically connected to the vehicle.

11. The device (10) of control and regulation of the pressure of tyres (22) according to claim 3, wherein the device is applied to agricultural machines used with heavy loads varying in time, such as harvesters, sprayers, spreaders and trailers.

* * * * *